Sept. 18, 1934.  S. G. HIRSCH  1,974,333
REEL
Filed April 28, 1934
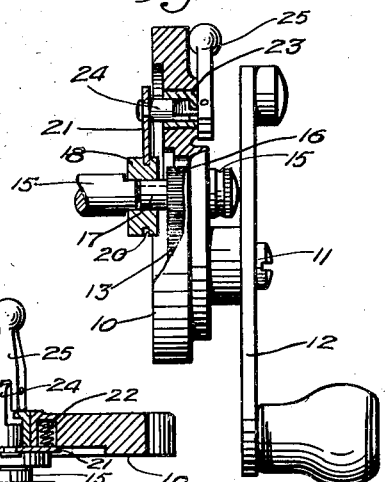
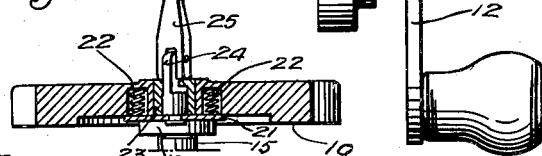
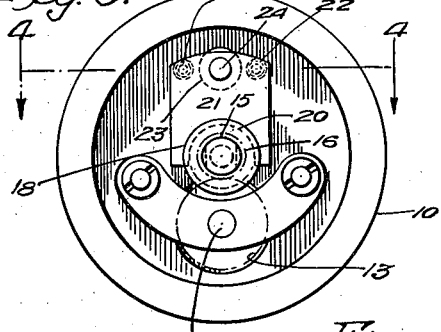
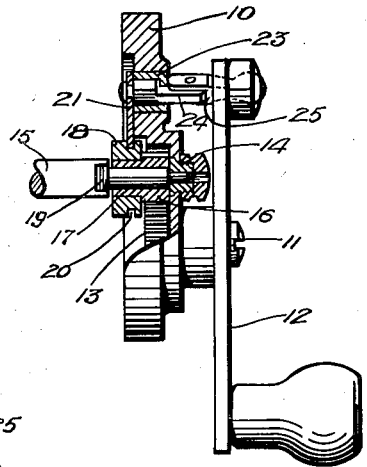
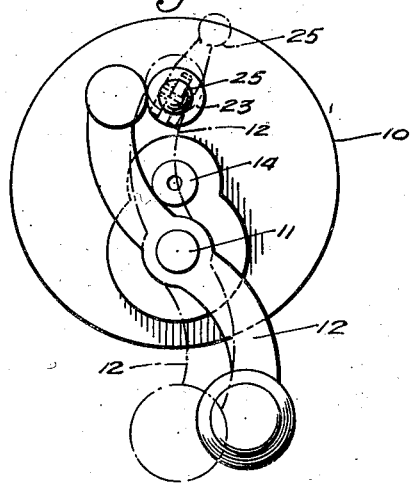
Inventor:—
Stephen G. Hirsch
by his Attorneys
Howson & Howson Patented Sept. 18, 1934

1,974,333

UNITED STATES PATENT OFFICE 1,974,333

REEL

Stephen G. Hirsch, Philadelphia, Pa., assignor to Ocean City Manufacturing Co., Philadelphia, Pa., a corporation of Pennsylvania Application April 28, 1934, Serial No. 722,955

7 Claims. (Cl. 242—84.7)

This invention relates to fishing reels, and more particularly to that type of fishing reel in which, during a casting operation, the spool is disconnected from the reel handle so that excessive friction is avoided. In such reels the disconnecting operation is accomplished through the medium of a sliding button, pivoted lever or the like which occupies either of two positions in one of which the spool may rotate independently of the handle. If often happens that a fisherman, after making a cast, will neglect to restore the connection between the reel handle and spool, with the result that if a fish strikes, he is unable to play the fish until he has restored the connection. This not only results in loss of fish through the delay, but care must be taken in effecting the connection if the line is being withdrawn rapidly by the fish, for with the establishment of the connection the reel handle in many types of reels begins to rotate and may inflict a painful injury.

An important object of this invention is the provision of a means for manually disconnecting or connecting the reel handle and spool which is of such character that the connection is automatically restored if, at any time during disconnection, the reel handle is rotated in a direction to wind line upon the reel.

A further and more specific object of the invention is the provision of an operating control movable to two positions in one of which the reel and spool are connected and in the other of which the reel and spool are disconnected, this control embodying a part located in the path of movement of the reel handle and engaged thereby so that it is moved from this second position into its first or connecting position by the contact.

These and other objects I attain by the construction shown in the accompanying drawing wherein, for the purpose of illustration, I have shown a preferred embodiment of my invention and wherein:

Fig. 1 is a fragmentary sectional view of a reel head and the adjacent portion of the spool spindle equipped in accordance with my invention, the parts being shown in their spool-driving position;

Fig. 2 is a similar view showing the parts in the "free spool" position;

Fig. 3 is an inner face view of the reel head;

Fig. 4 is a section on line 4—4 of Fig. 3; and

Fig. 5 is an outer face view of the reel head, the control lever being shown in solid lines in the "free spool" position and in dotted lines in the clutch connection position.

Referring now more particularly to the drawing, the numeral 10 generally designates the body of the reel head which may be of any suitable character and which mounts a rotatable shaft 11 to the outer end of which the reel handle 12 is secured, and upon which, adjacent its inner end, a gear 13 is mounted. The reel head likewise provides a bearing 14 for an end of the spool spindle 15. Rotatably mounted upon the spool spindle in any suitable fashion is a pinion 16 meshing with the gear 13 and splined upon the shank 17 of the pinion 16 as one element 18 of a clutch, the other element of this clutch being formed by providing flats 19 upon the adjacent portion of the spool spindle. When the clutch element 18 is slid inwardly upon the shank 17 to engage the spool spindle, the clutch element pinion and spool spindle operate as a unit and are, accordingly, rotated upon rotation of handle 12 and gear 13. The structure at present illustrated is but one of many variants of similar clutching and declutching means which are at present embodied in reel structures and forms no part of my invention except in combination with the mechanism now to be described.

The clutch element 18 is peripherally grooved, as indicated at 20 and engaging in this groove is a plate 21 which is normally urged inwardly by means of springs 22. Secured to the plate and slidably mounted in the body 10 in the bearing 23 provided therefor is a stud 24, to the outer end of which a cam lever 25 is pivoted. The pivotal connection of this cam lever is farther spaced from the end of the lever than the width of the lever with the result that when the lever 25 parallels the reel head, the stud 24 and plate 21 may move inwardly under the influence of springs 22 thereby shifting clutch element 18 into its operative position. When, however, the lever is perpendicular to the head, and has its end in engagement with the outer end of bearing 23, the stud and plate are drawn outwardly and clutch 18 is removed to its inoperative position and the reel placed in that condition known as "free spool". When the lever is in its perpendicular position, its outer end is arranged in the path of movement of either arm of handle 12 so that when this handle is rotated it engages the lever. This engagement of the handle with the lever causes it to be tilted to one side so that the action of the springs 22 urging the plate and stud inwardly tends to cause the movement to continue and the lever to be moved abruptly to its clutch-engaging position.

While I have in the present illustration provided a particular form of geared connection between the handle and the spool spindle, and a particular arrangement for causing declutching action involving the use of a clutch, it will be quite obvious to those familiar with the art that the principle herein embodied may be readily applied to those reel structures wherein the disconnection of the handle from the spool spindle is effected by bodily shifting one of the gears of the train to disconnect the train. I, accordingly, do not wish to be understood as limiting myself to the arrangement herein disclosed except as hereinafter claimed.

I claim:

1. In a reel, the combination of a spool spindle, a rotatable driving handle, means to operatively connect the handle and spindle whereby to rotate the spindle upon rotation of the handle; said connection including a member manually movable to either of two positions in one of which the connection is completed and in the other of which the connection is broken, an element to move said member, said element, when the member is in the last-named position, being disposed in the path of the handle to be engaged and moved toward the first-named position by said handle.

2. In a reel, the combination of a spool spindle, a rotatable driving handle, means to operatively connect the handle and spindle whereby to rotate the spindle upon rotation of the handle, said connection including a member manually movable to either of two positions in one of which the connection is completed and in the other of which the connection is broken, an element to move said member, said element, when the member is in the last-named position, being disposed in the path of the handle to be engaged and moved toward the first-named position by said handle, and spring means constantly tending to move the member to the first-named position and completing the movement of the element when initiated by the handle.

3. In a reel, the combination of a spool spindle, a driving means for the spindle, means to connect the spindle to or disconnect the spindle from said driving means, means to manually operate said connecting means to connect or disconnect the driving means, an operator-engaged device to operate the driving means and means to automatically actuate the manual means to restore the connection when said device is operated, said manual means comprising a part disposed in the path of movement of said device when said manual means is positioned to disconnect the driving means.

4. In a reel, the combination of a spool spindle, a head, a driving handle journaled for rotation in the head, a connection between the driving handle and spool spindle including a member movable to make or break the connection, a lever pivoted upon the head and movable from a position where it parallels the head and clears the driving handle to a position where it projects outwardly from the head and has its outer end disposed in the path of the driving handle whereby it will be engaged by the driving handle and moved from the last-named toward the first-named position, means to complete the movement of the lever from the last-named to the first-named position when it shall have been initiated by the driving handle and a connection between said movable member and the lever whereby the movable member is positioned to complete the connection when the lever is in the first-named position and to break the connection when the lever is in the last-named position.

5. In a reel, the combination of a spool spindle, a reel head, a rotatable handle carried by the head, means to connect the spindle and handle including a clutch, manual means for shifting said clutch to connect the spindle to or disconnect the spindle from the handle, and means to automatically actuate the last-named means to restore the connection when the handle is operated, said manual means comprising a lever projecting into the path of the reel handle when said lever is positioned to disconnect the reel handle and spindle.

6. In a reel, the combination of a spool spindle, a reel head, a handle rotatably mounted upon the reel head, a driving connection between the handle and spindle including an axially movable clutch member coacting with an adjacent end portion of the spindle, a plate to shift said clutch member, a spring constantly urging the clutch member into a position where the handle and spindle are connected, a stud secured to said plate and projecting through the reel head, and a lever pivoted to said stud and having cam-engagement with the reel head to draw the stud through the reel head and thereby disengage said clutch element from the spindle.

7. A device as claimed in claim 6 wherein the lever when in position to maintain the clutch element out of engagement with the spindle projects into the path of the operating handle to be engaged thereby and shifted from said position to permit the clutch member to reengage under influence of the spring.

STEPHEN G. HIRSCH.